(12) United States Patent
R et al.

(10) Patent No.: US 10,790,100 B1
(45) Date of Patent: Sep. 29, 2020

(54) PANEL ASSEMBLY SWITCH HAVING A SENSING ELEMENT

(71) Applicant: GM GLOBAL TECHNOLOGY OPERATIONS LLC, Detroit, MI (US)

(72) Inventors: Prathiba R, Karnataka (IN); Nithish Sukumar, Tamil Nadu (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/371,280

(22) Filed: Apr. 1, 2019

(51) Int. Cl.
| *H01H 3/12* | (2006.01) |
| *H01H 9/16* | (2006.01) |
| *B60K 35/00* | (2006.01) |
| *H01H 3/02* | (2006.01) |
| *B60R 16/027* | (2006.01) |
| *B60K 37/06* | (2006.01) |

(52) U.S. Cl.
CPC ............. *H01H 9/161* (2013.01); *B60K 35/00* (2013.01); *H01H 3/02* (2013.01); *H01H 3/12* (2013.01); *B60K 37/06* (2013.01); *B60R 16/027* (2013.01); *H01H 2217/032* (2013.01); *H01H 2231/026* (2013.01)

(58) Field of Classification Search
CPC ......... H01H 2025/043; H01H 2300/01; H01H 25/041; H01H 25/04; H01H 2025/048; H01H 2300/012; H01H 25/06; H01H 2025/045; H01H 25/002; H01H 2231/026; H01H 25/006; H01H 9/161; H01H 3/12; H01H 2217/032; H01H 3/02; B60K 35/00; B60K 37/06; B60R 16/027
See application file for complete search history.

(56) References Cited

U.S. PATENT DOCUMENTS

| 6,040,542 | A | * | 3/2000 | Wolfe | .................. B60Q 1/0082 200/512 |
| 7,262,375 | B2 | | 8/2007 | Sakai | |
| 2006/0241818 | A1 | * | 10/2006 | Kumon | .................. B62D 1/046 701/1 |
| 2010/0206703 | A1 | * | 8/2010 | Puzio | ........................ B25F 5/02 200/61.85 |
| 2017/0362878 | A1 | | 12/2017 | Gage | |
| 2018/0016837 | A1 | | 1/2018 | Bulpitt | |

* cited by examiner

*Primary Examiner* — Ahmed M Saeed

(57) ABSTRACT

One general aspect includes a device control switch for a panel assembly, including: a switch base mounted to the panel assembly; a switch button tiltably mounted to the switch base, the switch button configured to tilt away from a default position relative to a horizontal axis, the switch button including a nib; a flexibend sensor fixed to a portion of the switch base, the flexibend sensor in substantial contact with the nib via spring force; and where slight tilting of the switch button away from the default position will cause the flexibend sensor to deflect and remain in substantial contact with the nib as the nib moves with the switch button relative to the horizontal axis.

9 Claims, 5 Drawing Sheets

PANEL ASSEMBLY SWITCH HAVING A SENSING ELEMENT

INTRODUCTION

When a vehicle driver wants to open their window and places their hand on a power window switch panel, they may accidentally place their fingers on the wrong window switch and cause the wrong window to open. As a result, the driver could get distracted and reflexively divert their attention towards the door trim in order to locate the appropriate power window switch. However, this potentially dangerous situation could be avoided if the Driver Information Screen (DIC) or Heads Up Display (HUD) had been exhibiting information regarding which switch the driver is touching before they attempted to actuate the power window. To help alleviate unsafe driver distraction, it is therefore desirable to produce a system that can exhibit information about which power window switch the driver is touching so they know which window will be activated and do not have to look at the door trim while driving when they press the wrong one. Moreover, other desirable features and characteristics of the present invention will become apparent from the subsequent detailed description of the invention and the appended claims, taken in conjunction with the accompanying drawings and this background of the invention.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a device control switch for a panel assembly, including: a switch base mounted to the panel assembly; a switch button tiltably mounted to the switch base, the switch button configured to tilt away from a default position relative to a horizontal axis, the switch button including a nib; a flexibend sensor fixed to a portion of the switch base, the flexibend sensor in substantial contact with the nib via spring force; and where slight tilting of the switch button away from the default position will cause the flexibend sensor to deflect and remain in substantial contact with the nib as the nib moves with the switch button relative to the horizontal axis. Other embodiments of this aspect include corresponding computer systems, apparatus, and computer programs recorded on one or more computer storage devices, each configured to perform the actions of the methods.

Implementations may include one or more of the following features. The device control switch where: the flexibend sensor is operatively connected to an electronic control unit (ECU); and when the flexibend sensor is deflected, a signal will be sent to the ECU. The device control switch where information based on the signal to the ECU is exhibited on a display. The device control switch where the flexibend sensor is a cantilever having one end fixed to the portion of the switch base. The device control switch where, when the switch button is tilted to an actuation position, the device control switch will send an actuation signal to a device, the actuation signal configured to actuate the device. The device control switch where the panel assembly is located on a front door trim for a vehicle door, a steering wheel, an overhead trim configured to be installed in a vehicle interior, a center console configured to be installed in the vehicle interior, an instrument panel configured to be installed in the vehicle interior, or a vehicle seat. A vehicle including the device control switch. Implementations of the described techniques may include hardware, a method or process, or computer software on a computer-accessible medium.

One general aspect includes a device control switch for a panel assembly, including: a switch base molded to the panel assembly; a switch button tiltably mounted to the switch base, the switch button configured to tilt away from a default position relative to a horizontal axis, the switch button configured to fully tilt along the horizontal axis to an actuation position, the switch button including a nib; a cantilever sensor having an end being affixed to a portion of the switch base, the flexibend sensor in substantial contact with the nib via spring force, the flexibend sensor being operatively connected to an electronic control unit (ECU); where slight tilting of the switch button away from the default position will cause the flexibend sensor to deflect and remain in substantial contact with the nib as the nib moves with the switch button relative to the horizontal axis, and a signal will be sent to the ECU; where information based on the signal to the ECU is exhibited on a display located in a vehicle interior; and where, when the switch button is fully tilted to the actuation position, the device control switch will send an actuation signal to a vehicle device, the actuation signal configured to actuate the vehicle device. Other embodiments of this aspect include corresponding computer systems, apparatus, and computer programs recorded on one or more computer storage devices, each configured to perform the actions of the methods.

One general aspect includes a push button switch for a panel assembly, including: a switch base mounted to the panel assembly; a switch button pressably mounted to the switch base, the switch button configured to move towards the switch base relative to a substantially vertical axis, the switch button including a nib; a flexibend sensor fixed to a portion of the switch base, the flexibend sensor in substantial contact with the nib via spring force; and where slight movement of the switch button towards the switch base will cause the flexibend sensor to deflect and remain in substantial contact with the nib as the nib moves with the switch button relative to the vertical axis. Other embodiments of this aspect include corresponding computer systems, apparatus, and computer programs recorded on one or more computer storage devices, each configured to perform the actions of the methods.

Implementations may include one or more of the following features. The device control switch where: the flexibend sensor is operatively connected to an electronic control unit (ECU); and when the flexibend sensor is deflected, a signal will be sent to the ECU. The device control switch where information based on the signal to the ECU is exhibited on a display. The device control switch where the flexibend sensor is a cantilever having one end fixed to the portion of the switch base. The device control switch where, when the switch button is tilted to an actuation position, the device control switch will send an actuation signal to a device, the actuation signal configured to actuate the device. The device control switch where the panel assembly is located on a front door trim for a vehicle door, a steering wheel, an overhead trim configured to be installed in a vehicle interior, a center console configured to be installed in the vehicle interior, an instrument panel configured to be installed in the vehicle interior, or a vehicle seat. The device control switch where the panel assembly is located on a front door trim for a vehicle door, a steering wheel, an overhead trim configured to be installed in a vehicle interior, a center console configured to be installed in the vehicle interior, an instrument panel configured to be installed in the vehicle interior, or a vehicle seat. A vehicle including the device control switch. Implementations of the described techniques may include hardware, a method or process, or computer software on a computer-accessible medium.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
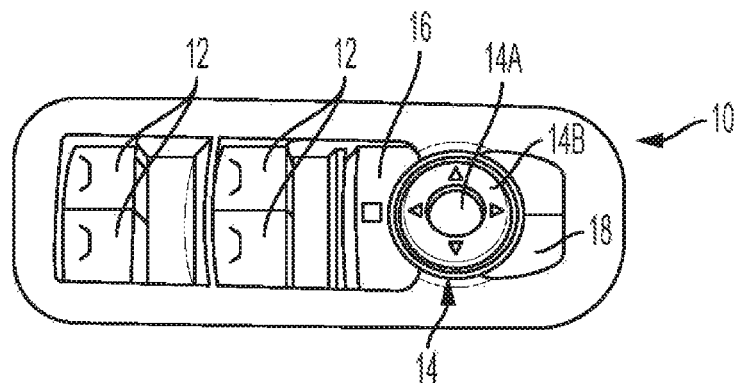
FIG. 1 is a plan view of a conventional panel assembly in accordance with one or more exemplary embodiments.
Figure 4:
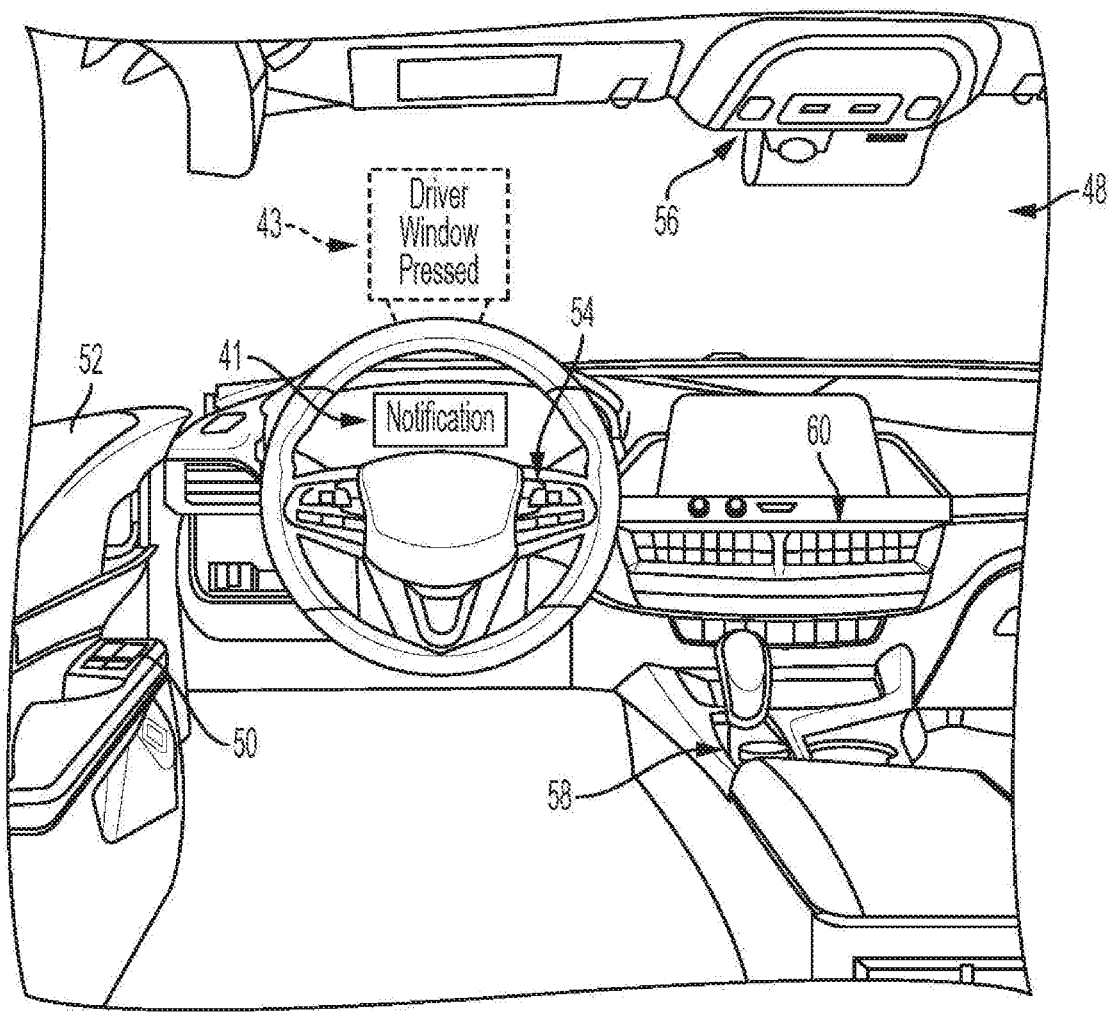
FIG. 4 is a perspective view of a vehicle interior in accordance with one or more exemplary embodiments.

FIG. 1 discloses a conventional panel assembly 10 for a plurality of control switches for operating the power windows 12 and power side mirrors 14 of a vehicle, which can be formed as a part of an arm rest panel disposed on the door trim of the driver's side door (FIG. 4). As follows, control switches 12 of the multifunction panel assembly 10 are used for opening/closing a respective power window. The side mirror control switch 14 includes a push button switch portion 14A (individual switch) disposed at the center and a multi-directional switch portion 14B arranged at eight (8) peripheral positions, which can cause the power mirror to move in eight (8) corresponding directions (front/rear, left/right and four diagonal directions). Moreover, the multifunction panel assembly 10 can include a switch 16 for retarding one of the power mirrors and can include a switch 18 for locking/unlocking the power windows.

Figure 2:
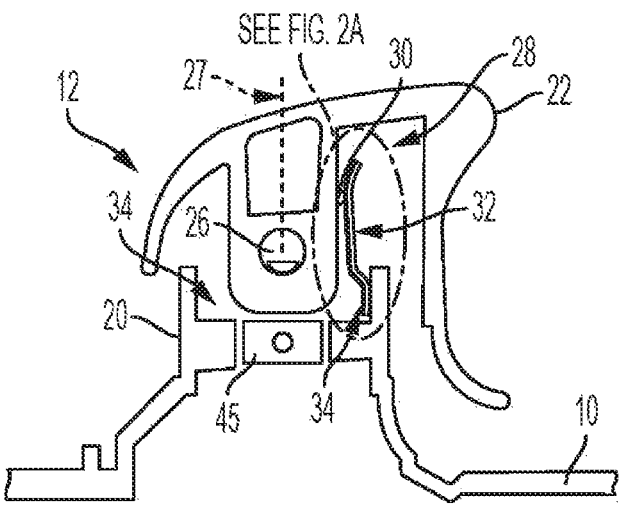
FIG. 2 is a side view of a device control switch system in accordance with one or more exemplary embodiments.
Figure 2A:
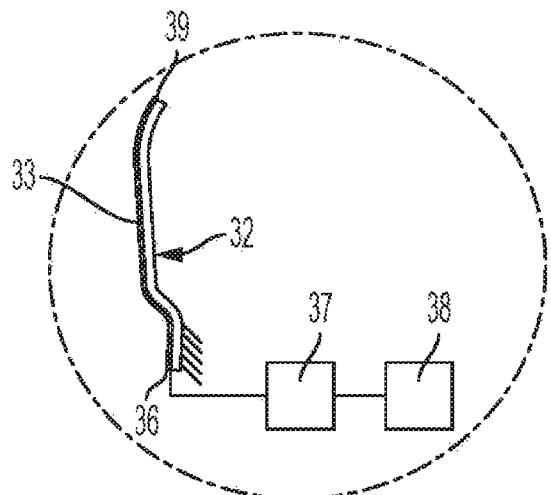
FIG. 2A depicts an exemplary aspect of the switch system of FIG. 2 in accordance with one or more exemplary embodiments.

Each of the power window control switches 12 is of a push-pull resetting type, which can have two-staged switch functions in each of the push direction and the pull direction. The first stage of weak push or pull operation of this switch may open or close the selected power window(s) while the switch is kept in that stage. When the second stage of strong (full) push or pull operation of the switch was performed, the power window on the driver's seat side is fully opened or closed by the action of the automatic window opening/closing function. As can be seen in FIGS. 2 and 2A, each of these power window control switches 12 includes a switch base 20 that is intermolded into the rest of panel assembly 10. The switch base 20 provides a foundation to support a switch button 22 and allows the button 22 to snap into a pair of fasteners along the interior of base 20, via a button axle 26 extending from the exterior of the button 22. Moreover, the button 22 is ergonomically designed to receive a user's finger at both the top and side of the switch button 22. As follows, the user (e.g., vehicle occupant) can push-pull the switch button 22 with their finger and thus the switch button 22 will tilt away from its default position in either the forward or backward direction, and respective to a horizontal axis established by the button axle 26.

As can be seen, the switch button 22 includes an internal cavity 28 with a nib 30 joined to a centrally located interior wall of this cavity 28. The nib 30 is a nonconductive protrusion that can be made from the same material as the switch button 22, when the switch button 22 is manufactured from nonconductive material (e.g., polymer, resin, etc.), and the nib 30 can extend slightly from this centrally located interior wall of the cavity 28 (e.g., one (1) millimeter). Conversely, the switch base 20 includes a receptacle area 34 with a flexibend sensor 32 affixed to the interior side of an outer wall of the receptacle area 34. As shown, the flexibend sensor 32 is a vertically oriented cantilever having a leaf spring portion 33 to provide stiff spring force to the rest of the cantilever 32. The cantilever 32 can also be made of a flexible or semiflexible and conductive material (e.g., some kind of metal). The lower end 36 of the cantilever is affixed to the receptacle area 34 wall by means of, for example, a rivet, adhesive, nail, or screw. The lower end 36 of the cantilever may also be operatively connected to an electronic control unit (ECU) 37 of the vehicle and therefore indirectly connected to a display 38 located in the vehicle's interior (e.g., the Driver Information Screen (DIC) 41 or Heads Up Display (HUD) 43). In addition, the upper end 39 of the cantilever 32 is in contact with the nib 30. As such, a point on the cantilever 32 will press against or rub against the nib 30 via stiff spring force provided by the leaf spring 33 (i.e., this point on the cantilever 32 will be in touch contact with the nib 30).

Figure 2B:
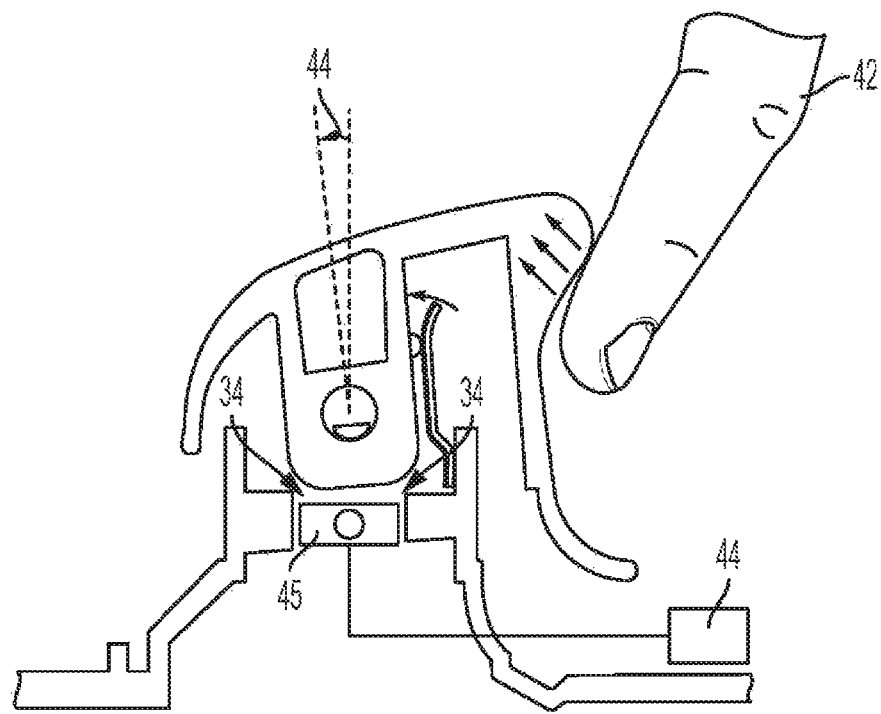
FIG. 2B depicts another exemplary aspect of the switch system of FIG. 2 in accordance with one or more exemplary embodiments.

As can be understood with reference to FIG. 2B, when the user 42 places their finger on either the top or side of the switch button 22, the slight force created by this touching will cause the switch button 22 to tilt ever so slightly away from its default position 27 (one half of one (1) millimeter). Furthermore, this slight tilting will create a minute deviation of the nib's 30 location in relation to the horizontal axis (the nib 30 will move clockwise or counter-clockwise around the horizontal axis—shown as counter-clockwise in FIG. 2B, as indicated by the arrows) and thus will cause the flexibend sensor 32 to move with the nib 30. In essence, the small movements of the nib 30 with the rest of the witch button 22 will cause at least the upper end 39 of the flexibend sensor 32 to be disturbed into a deflected orientation that causes the sensor's upper end 39 to remain in contact with the nib 30, via the spring force from leaf spring 33, and thus the cantilever 32 will remain substantially pressed against the side of the nib 30. As follows, when the nib 30 moves counter-clockwise relative to the horizontal axis, releasing of spring tension will cause the upper end 39 of the cantilever 32 to move in a manner corresponding to that of the nib 30 (and thus remain in contact with the nib 30 during at least a substantial portion of its counter-clockwise movement). However, if the nib 30 moves clockwise relative to the horizontal axis, building of spring tension in the leaf spring 33 will cause the upper end 39 of cantilever 32 to move in a manner corresponding that of the nib 30 (and thus remain pressed against the nib 30 during at least a substantial portion of its clockwise movement).

When the flexibend sensor 32 is in a deflected orientation, the sensor 32 will send a signal to the ECU 37 that lets the ECU 37 know which particular switch 12 is being touched at that moment. Moreover, the ECU 37 will decipher the signal and generate a notification to be exhibited on the DIC 41 and/or HUD 43 (FIG. 4). As follows, the notification can state which control switch 12 of the panel assembly 10 is being touched at that moment or the notification may be a picture of the panel assembly 10 with the specific control switch 12 being distinguished (see FIGS. 5 and 5A). This will allow the user (e.g., the vehicle operator) to know which button they are pressing without having to look down at the panel assembly 10 and take their eyes off the road.

In addition, a conventional switch 45 can be installed in the receptacle area 34 of the switch base 20, as is generally known. Thus, after the user knows which control switch 12 they are touching, they can use their finger to fully tilt the switch into an actuation position (e.g., 30-45 degrees away from the default position relative to the horizontal axis) so as to send an actuation signal to activate the power window 44 (i.e., to allow the window to open or close).

Figure 3:
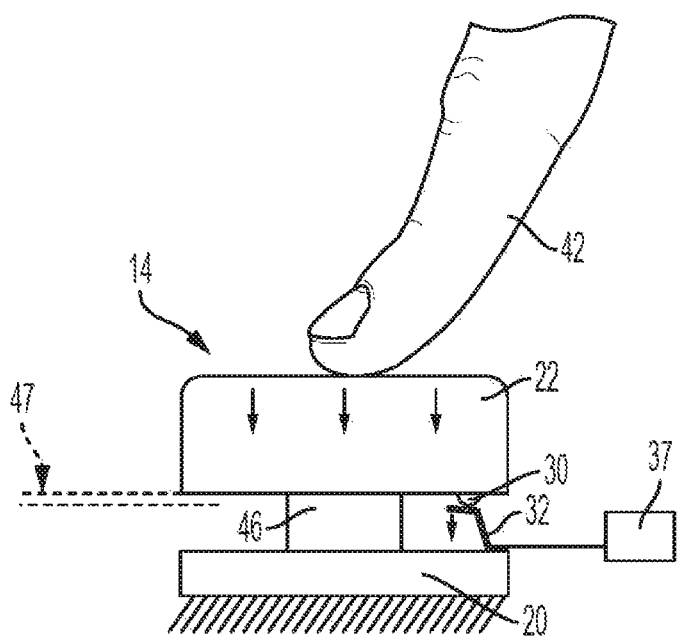
FIG. 3 is a side view of an alternative device control switch system in accordance with one or more exemplary embodiments.

As can be seen in FIG. 3, an embodiment of the flexibend sensor 32 can also be incorporated into push button portion of the side mirror control switch 14. In this embodiment, the switch button 22 can be mounted to a spring-like switch element 46 that protrudes from the switch base 20. Moreover, the switch element 46 enables the switch button 22 to be pressed down along a substantially vertical axis (e.g., between 85 to 95 degrees) and thus move towards the switch base 20. The nib 30 is joined to the underside of the switch button 22. In addition, the flexibend sensor 32 is affixed to the topside of the switch base 20 (e.g., via adhesive, rivets, nails, screws, etc.) and has a bent over shape such that the sensor can also be joined to the nib 30.

Figure 5:
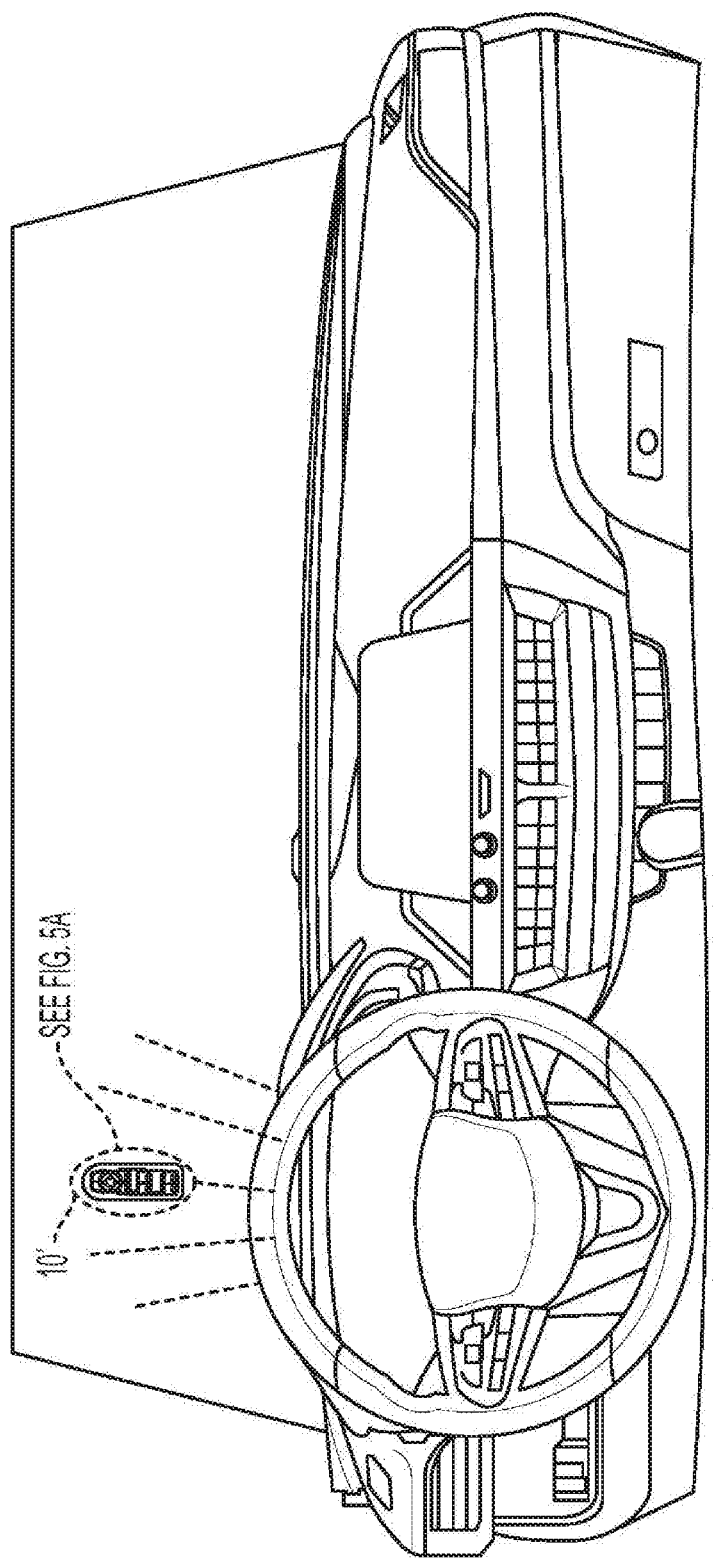
FIG. 5 is another perspective view of the vehicle interior of FIG. 4 in accordance with one or more exemplary embodiments.

As follows, when the user 42 places their finger on top of the push button switch 22, the slight force created by this touching action will cause the switch button 22 to move ever so slightly away from its default position 47 and downward towards the switch base 20. Furthermore, this slight pressing force will create a minute deviation of the nib's 30 location in relation to the switch base 20 and thus will push on the flexibend sensor 32. Therefore, the small movements of the nib 30 will cause the flexibend sensor 32 to be disturbed into a deflected orientation via the spring force and thus at least a portion of the cantilever will remain pressed against the underside of the nib 30. As such, the stiff spring force of the leaf spring 33 will cause the cantilever to push upwardly and against the nib 30, while the nib 30 moves in a downward fashion, and thus the cantilever will remain in contact with the nib 30 during at least a substantial portion of this downward movement. In addition, when the flexibend sensor 32 is deflected in such a manner, the sensor will send a signal to the ECU 37 that lets the ECU 37 know which particular switch 12 is being touched at that moment. Moreover, the ECU 37 will decipher the signal and generate a notification to be exhibited on the DIC 41 and/or HUD 43 (FIG. 5). As follows, the notification can show that the push button portion of the side mirror control switch 14 is being touched at that moment or the notification may be a picture of the panel assembly 10 with the side mirror control switch 14 being illuminated.

Figure 5A:
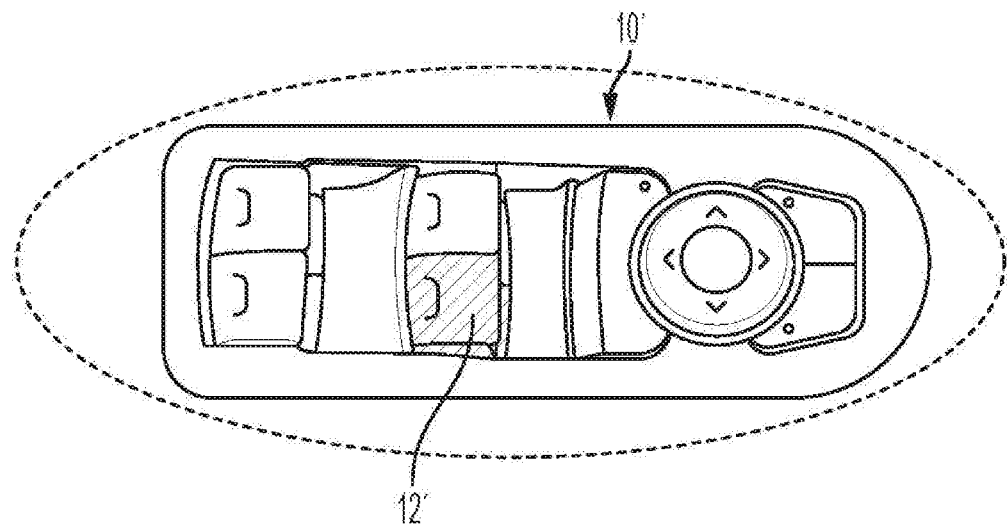
FIG. 5A depicts an exemplary aspect of the switch system of FIG. 2 in accordance with one or more exemplary embodiments.
Figure 6:
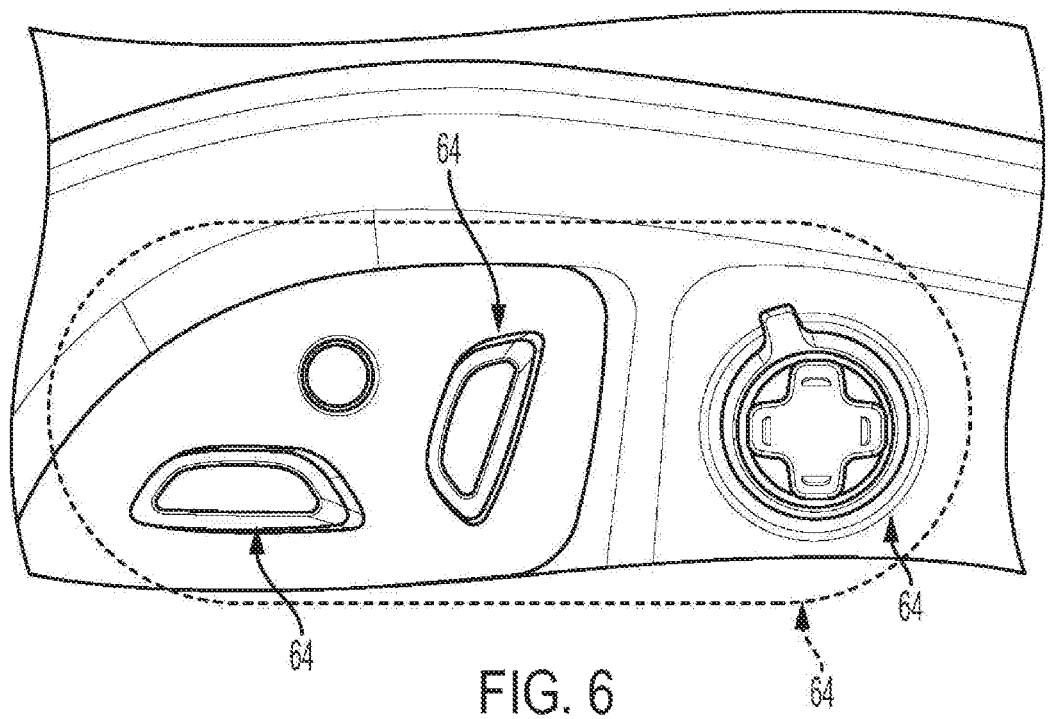
FIG. 6 is a side view of a portion of a vehicle seat in accordance with one or more exemplary embodiments of the switch system.

A vehicle interior 48 is shown in FIG. 4. As shown, in one or more embodiments, the panel assembly 10 can be installed on the arm rest portion of the front door trim 50 of the driver side door 52 (e.g., the power window control panel). In one or more additional embodiments, however, the panel assembly 10 can also be installed on or next to the steering wheel 54 (e.g., the cruise control and headlamp control panel). The panel assembly 10 can also be installed on the overhead trim 56 of the ceiling of the interior 48 (e.g., the sunroof control panel). The panel assembly 10 can also be installed at the center console 58 (e.g., next to one or two cup holders) of the vehicle interior 48. The panel assembly 10 can also be installed on the instrument panel 60 (i.e., the HVAC and radio control panels of the dash board). As can also be seen in this figure, the notification is displayed via the DIC 41 and/or the HUD 43 (which will be off the windshield of the vehicle or can be on a screen next to the windshield), as discussed above. As shown in FIGS. 5 and 5A, the notification can also be a graphical representation of panel assembly 10'. As can be seen, the graphical representation also highlights by shading/illuminating which switch button 12' is being pressed by the user while they are pressing the button. As shown in FIG. 6, the panel assembly 10 can also be installed on the side of vehicle seat 64 (e.g., the power switches to enable seat movement). It should be understood that any of the switches on the side of vehicle seat 64 can include an embodiment of control switch 12.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A panel assembly installed in a vehicle, the panel assembly comprising a plurality of device control switches, at least one device control switch of the plurality of device control switches comprising:
   a switch base mounted to the panel assembly;
   a switch button tiltably mounted to the switch base, the switch button configured to tilt away from a default position relative to a horizontal axis, the switch button having a cavity with a nib joined to a centrally located interior wall of the cavity, the nib being a nonconductive protrusion;
   a vertically oriented flexibend sensor installed within the cavity, the flexibend sensor being a cantilever made from a flexible conductive material, a lower end of the flexibend sensor affixed to an interior side of an outer wall of a receptacle area of the switch base, an upper end of the flexibend sensor being in substantial contact with the nib via spring force from a leaf spring portion of the flexibend sensor, the flexibend sensor being operatively connected to an electronic control unit (ECU); and
   wherein slight tilting of the switch button away from the default position will cause the flexibend sensor to deflect and remain in substantial contact with the nib as the nib moves with the switch button relative to the horizontal axis, wherein, when the flexibend is deflected, the flexibend sensor will send a signal to the ECU, and wherein the ECU will decipher the signal and generate a notification to be exhibited on a graphical display located within the vehicle, wherein the notification is configured to be a graphical image representation of the panel assembly that highlights the device control switch having slight tilting of the switch button so as to allow a user to understand which device control switch of the plurality of device control switches is being pressed by the user, and wherein the graphical display is not a component of the panel assembly.

2. The panel assembly of claim 1, wherein, when the switch button is tilted to an actuation position, the device control switch will send an actuation signal to a device, the actuation signal configured to actuate the device.

3. The panel assembly of claim 1, wherein the panel assembly is located on a front door trim for a vehicle door, a steering wheel, an overhead trim configured to be installed in a vehicle interior, a center console configured to be installed in the vehicle interior, an instrument panel configured to be installed in the vehicle interior, or a vehicle seat.

4. The panel assembly of claim 1, wherein the graphical display is a Driver Information Screen (DIC) or Heads Up Display (HUD).

5. The panel assembly of claim 1, wherein the graphical image representation is reflected off of an interior side of a windshield of the vehicle.

6. A panel assembly installed in a vehicle, the panel assembly comprising a plurality of device control switches, at least one device control switch of the plurality of device control switches comprising:
   a switch base molded to the panel assembly;
   a switch button tiltably mounted to the switch base, the switch button configured to tilt away from a default position relative to a horizontal axis, the switch button configured to fully tilt along the horizontal axis to an actuation position, the switch button having a cavity with a nib joined to a centrally located interior wall of the cavity, the nib being a nonconductive protrusion;
   a vertically oriented flexibend sensor installed within the cavity, the flexibend sensor being a cantilever made from a flexible conductive material, a lower end of the flexibend sensor affixed to an interior side of an outer wall of a receptacle area of the switch base, an upper end of the flexibend sensor being in substantial contact with the nib via spring force from a leaf spring portion of the flexibend sensor, the flexibend sensor being operatively connected to an electronic control unit (ECU);
   wherein slight tilting of the switch button away from the default position will cause the flexibend sensor to deflect and remain in substantial contact with the nib as the nib moves with the switch button relative to the horizontal axis, wherein, when the flexibend is deflected, the flexibend sensor will send a signal to the ECU, and wherein the ECU will decipher the signal and generate a notification to be exhibited on a graphical display located within the vehicle, wherein the notification is configured to be a graphical image representation of the panel assembly that highlights the device control switch having slight tilting of the switch button so as to allow a user to understand which device control switch of the plurality of device control switches is being pressed by the user, and wherein the graphical display is not a component of the panel assembly; and
   wherein, when the switch button is fully tilted to the actuation position, the device control switch will send an actuation signal to a vehicle device, the actuation signal configured to actuate the vehicle device.

7. The panel assembly of claim 6, wherein the panel assembly is located on a front door trim for a vehicle door, a steering wheel, an overhead trim configured to be installed in a vehicle interior, a center console configured to be installed in the vehicle interior, an instrument panel configured to be installed in the vehicle interior, or a vehicle seat.

8. The panel assembly of claim 6, wherein the graphical display is a Driver Information Screen (DIC) or Heads Up Display (HUD).

9. The panel assembly of claim 6, wherein the graphical image representation is reflected off of an interior side of a windshield of the vehicle.

* * * * *